(12) United States Patent
Ryu et al.

(10) Patent No.: US 12,482,102 B2
(45) Date of Patent: Nov. 25, 2025

(54) ELECTRONIC DEVICE FOR PREDICTING SARCOPENIA AND OPERATION METHOD THEREOF

(71) Applicant: VISUWORKS Inc., Seoul (KR)

(72) Inventors: Ik Hee Ryu, Seoul (KR); Jin Kuk Kim, Seoul (KR); Tae Keun Yoo, Seoul (KR); Eok Soo Han, Daejeon (KR)

(73) Assignee: VISUWORKS Inc., Seoul (KR)

( * ) Notice: Subject to any disclaimer, the term of this patent is extended or adjusted under 35 U.S.C. 154(b) by 337 days.

(21) Appl. No.: 18/139,679

(22) Filed: Apr. 26, 2023

(65) Prior Publication Data
US 2024/0346656 A1 Oct. 17, 2024

(30) Foreign Application Priority Data
Apr. 12, 2023 (KR) .................. 10-2023-0048181

(51) Int. Cl.
G06T 7/00 (2017.01)
A61B 3/00 (2006.01)
(Continued)

(52) U.S. Cl.
CPC .......... G06T 7/0014 (2013.01); A61B 3/0025 (2013.01); G06T 7/74 (2017.01);
(Continued)

(58) Field of Classification Search
CPC .............. G06T 7/0014; G06T 7/74; G06T 2207/20081; G06T 2207/20084;
(Continued)

(56) References Cited

U.S. PATENT DOCUMENTS

2020/0085290 A1* 3/2020 Wang .................. A61B 3/12
2021/0378510 A1* 12/2021 Park .................... G06T 7/0012
(Continued)

FOREIGN PATENT DOCUMENTS

KR         20220041431 A   *  9/2020
KR    10-2021-0073388 A      6/2021
(Continued)

OTHER PUBLICATIONS

Reporter Lee, Saebom, Is it possible to diagnose dementia just by looking at a photo of an eye?, Maeil Business Newspaper, URL: https://n.news.naver.com/article/009/0004737853, Posted Jan. 23, 2021.

Primary Examiner — Syed Haider
(74) Attorney, Agent, or Firm — Heedong Chae; Lucem, PC

(57) ABSTRACT

Disclosed is an electronic device for predicting sarcopenia, which includes a memory and a processor connected with the memory to execute instructions included in the memory. The processor extracts a first result value as output data for a first machine learning model by using an eye image of a subject as input data for the first machine learning model and determines whether sarcopenia of the subject occurs based on the first result value. The first result value includes an MRD1 value of the subject corresponding to the eye image, an upper eyelid edge location change value, an eye closing speed value, and an eye opening speed value.

9 Claims, 15 Drawing Sheets

(51) Int. Cl.
  *G06T 7/73* (2017.01)
  *G16H 50/50* (2018.01)
(52) U.S. Cl.
  CPC ... *G16H 50/50* (2018.01); *G06T 2207/20081* (2013.01); *G06T 2207/20084* (2013.01); *G06T 2207/30041* (2013.01)
(58) Field of Classification Search
  CPC .......... G06T 2207/30041; G06T 2207/10101; G16H 50/50; G16H 50/20; A61B 3/0025
  See application file for complete search history.

(56) References Cited

U.S. PATENT DOCUMENTS

| | | | |
|---|---|---|---|
| 2022/0082574 A1* | 3/2022 | Watanabe | G06N 3/02 |
| 2023/0162359 A1* | 5/2023 | Choi | G16H 50/20 |
| | | | 382/128 |

FOREIGN PATENT DOCUMENTS

| | | |
|---|---|---|
| KR | 10-2022-0001162 A | 1/2022 |
| KR | 10-2022-0041431 A | 4/2022 |
| KR | 10-2022-0068440 A | 5/2022 |

\* cited by examiner

ELECTRONIC DEVICE FOR PREDICTING SARCOPENIA AND OPERATION METHOD THEREOF

CROSS-REFERENCE TO RELATED APPLICATION(S)

This application is based on and claims priority under 35 U.S.C. § 119 to Korean Patent Application No. 10-2023-0048181, filed on Apr. 12, 2023, in the Korean Intellectual Property Office, the disclosure of which is incorporated by reference herein its entirety.

BACKGROUND

1. Field

The disclosure relates to an electronic device for predicting sarcopenia using a fundus image or the like and an operation method thereof.

2. Description of Related Art

Sarcopenia refers to a symptom of gradually losing skeletal muscle mass and strength. Sarcopenia is an important health problem in the elderly population because it is able to lead to falls, functional decline, fractures, and the like.

Due to the aging of the global population, sarcopenia has recently been recognized as an independent clinical entity, and the prevalence of sarcopenia continues to rise.

Several studies have shown that sarcopenia is associated with various metabolic and chronic diseases. As the level of physical activity decreases due to other factors, muscle mass decreases. As a result, this adversely affects metabolism and chronic diseases.

Recent studies have found several biomarkers associated with skeletal muscle changes, but these biomarkers should be obtained through invasive blood tests.

Many researchers determine that eye images, fundus images, and the like are able to be obtained easily and inexpensively through the eyes of the subject, and various diseases are able to be diagnosed at an early stage or the degree of risk is able to be predicted by analyzing the blood vessels, retinal nerve fiber layer, macula, optic disc, and the like shown in the fundus images.

However, because it is difficult to determine the microscopic lesions on fundus images with the naked eye and it is practically difficult for a person to distinguish fundus images individually, it is necessary to develop a technology for analyzing fundus images using artificial intelligence.

SUMMARY

Aspects of the disclosure are to address at least the above-mentioned problems and/or disadvantages and to provide at least the advantages described below. Accordingly, an aspect of the disclosure is to provide an electronic device for predicting sarcopenia using an artificial intelligence machine learning model constructed based on an eye image, a fundus image, or the like and an operation method thereof.

In accordance with an aspect of the disclosure, an electronic device for predicting sarcopenia may include a memory and a processor connected with the memory and configured to execute instructions included in the memory. The processor may extract a first result value as output data for a first machine learning model by using an fundus image of a subject as input data for the first machine learning model and may determine whether sarcopenia of the subject occurs based on the first result value. The first result value includes a value for whether macular degeneration corresponding to the fundus image occurs and a value for whether retinopathy corresponding to the fundus image occurs.

According to embodiments of the disclosure, the processor may extract a second result value as output data for a second machine learning model by using a eye image of the subject as input data for the second machine learning model and may determine whether the sarcopenia of the subject occurs based on the first result value and the second result value. The second result value includes an $MRD_1$ value of the subject corresponding to the eye image, an upper eyelid edge location change value, an eye closing speed value, and an eye opening speed value, the $MRD_1$ value being a distance where light is reflected from an upper eyelid edge to a cornea of the subject.

According to embodiments of the disclosure, the processor may extract a third result value as output data for a third machine learning model by using a slit lamp examination image of the subject as input data for the third machine learning model and may determine whether the sarcopenia of the subject occurs based on the first result value, the second result value, and the third result value. The third result value may include a value for whether pterygium corresponding to the slit lamp examination image occurs and a value for whether cataract corresponding to the slit lamp examination image occurs.

According to embodiments of the disclosure, the processor may differently set weights respectively corresponding to the first result value, the second result value, and the third result value depending on basic information of the subject and may determine the sarcopenia of the subject occurs based on the set weights, the first result value, the second result value, and the third result value.

According to embodiments of the disclosure, the processor may collect first training data, may process a first training dataset based on the first training data, may construct the first machine learning model based on the first training dataset, and may determine performance of the first machine learning model at a predetermined period. The first training data may include eye images for a plurality of subjects.

According to embodiments of the disclosure, the processor may collect second training data, may process a second training dataset based on the second training data, may construct the second machine learning model based on the second training dataset, and may determine performance of the second machine learning model at a predetermined period. The second training data may include fundus images for a plurality of subjects.

According to embodiments of the disclosure, the processor may collect third training data, may process a third training dataset based on the third training data, may construct the third machine learning model based on the third training dataset, and may determine performance of the third machine learning model at a predetermined period. The third training data may include slit lamp examination images for a plurality of subjects.

In accordance with another aspect of the disclosure, an operation method of an electronic device for predicting sarcopenia may include collecting a fundus image of a subject, extracting a first result value as output data for a first machine learning model by using the fundus image as input data for the first machine learning model, and determining whether there sarcopenia of the subject occurs based on the first result value. The first result value includes a value for whether macular degeneration corresponding to the fundus image occurs and a value for whether retinopathy corresponding to the fundus image occurs.

According to embodiments of the disclosure, the operation method may further include collecting an eye image of the subject, extracting a second result value as output data for a second machine learning model by using the eye image as input data for the second machine learning model, and determining whether the sarcopenia of the subject occurs based on the first result value and the second result value. The second result value includes an $MRD_1$ value of the subject corresponding to the eye image, an upper eyelid edge location change value, an eye closing speed value, and an eye opening speed value, the $MRD_1$ value being a distance where light is reflected from an upper eyelid edge to a cornea of the subject.

According to embodiments of the disclosure, the operation method may further include collecting a slit lamp examination image of the subject, extracting a third result value as output data for a third machine learning model by using the slit lamp examination image as input data for the third machine learning model, and determining whether the sarcopenia of the subject occurs based on the first result value, the second result value, and the third result value. The third result value may include a value for whether pterygium corresponding to the slit lamp examination image occurs and a value for whether cataract corresponding to the slit lamp examination image occurs.

In accordance with another aspect of the disclosure, an operation method of an electronic device for predicting sarcopenia may include collecting a first eye image of a subject, extracting a feature point for an eye entity from the first eye image, determining a first eye area based on the extracted feature point, and identifying first coordinates corresponding to an upper eyelid edge location for the determined first eye area and second coordinates corresponding to a pupil location for the determined first eye area, calculating an $MRD_1$ value using the first coordinates and the second coordinates, the $MRD_1$ value being a distance where light is reflected from an upper eyelid edge to a cornea of the subject, and comparing the $MRD_1$ value with a predetermined threshold to predict the sarcopenia.

According to embodiments of the disclosure, the operation method may further include collecting a second eye image where the subject is looking down, collecting a third eye image where the subject is looking up, extracting a feature point for an eye entity from the second eye image and determining a second eye area corresponding to the second eye image based on the extracted feature point, identifying third coordinates corresponding to an upper eyelid edge location for the determined second eye area, extracting a feature point for an eye entity from the third eye image and determining a third eye area corresponding to the third eye image based on the extracted feature point, identifying fourth coordinates corresponding to an upper eyelid edge location for the determined third eye area, calculating an upper eyelid edge location change value using the third coordinates and the fourth coordinates, and predicting the sarcopenia based on the calculated upper eyelid edge location change value and the $MRD_1$ value.

According to embodiments of the disclosure, the operation method may further include collecting a fourth eye image at a first time point when the subject opens his or her eyes, collecting a fifth eye image at a second time point when the subject closes the eyes, collecting a sixth eye image at a third time point when the subject opens the eyes again, extracting a feature point for an eye entity from the fourth eye image and determining a fourth eye area corresponding to the fourth eye image based on the extracted feature point, identifying fifth coordinates corresponding to an upper eyelid edge location for the determined fourth eye area, extracting a feature point for an eye entity from the fifth eye image and determining a fifth eye area corresponding to the fifth eye image based on the extracted feature point, identifying sixth coordinates corresponding to an upper eyelid edge location for the determined fifth eye area, extracting a feature point for an eye entity from the sixth eye image and determining a sixth eye area corresponding to the sixth eye image based on the extracted feature point, identifying seventh coordinates corresponding to an upper eyelid edge location for the determined sixth eye area, calculating a speed at which the subject closes the eyes and a speed at which the subject opens the eyes using the first time point, the second time point, the third time point, the fifth coordinates, the sixth coordinates, and the seventh coordinates, and predicting the sarcopenia based on the speed at which the subject closes the eyes, the speed at which the subject opens the eyes, the upper eyelid edge location change value, and the $MRD_1$ value.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
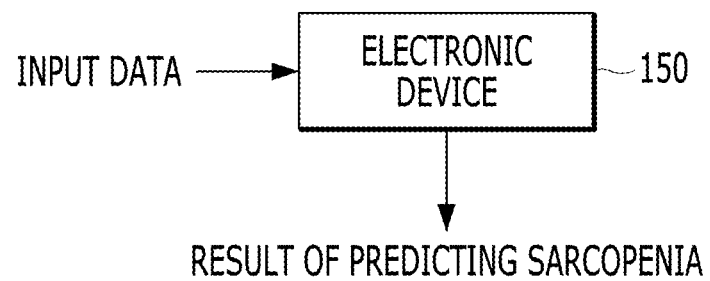
FIG. 1 is a drawing about a sarcopenia prediction system according to an embodiment of the disclosure.

Hereinafter, various embodiments of the disclosure will be described with reference to accompanying drawings. However, it should be understood that the disclosure is not intended to be limited to a specific embodiment and includes various modifications, equivalents, and/or alternatives of embodiments of the disclosure. With regard to description of drawings, similar denotations may be used for similar components.

In the disclosure, the expressions "have", "may have", "include" and "comprise", or "may include" and "may comprise" used herein indicate existence of corresponding features (e.g., components such as numeric values, functions, operations, or parts) but do not exclude presence of additional features.

In the disclosure, the expressions "A or B", "at least one of A or/and B", or "one or more of A or/and B", and the like may include any and all combinations of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", "1st", "2nd", or the like used in the disclosure may be used to refer to various components regardless of the order and/or the priority and to distinguish the relevant components from other components, but do not limit the components. For example, without departing the scope of the disclosure, a first component may be referred to as a second component, and similarly, a second component may be referred to as a first component.

According to the situation, the expression "configured to" used in the disclosure may be used exchangeably with, for example, the expression "suitable for", "having the capacity to", "designed to", "adapted to", "made to", or "capable of". The term "configured to" must not mean only "specifically designed to".

In the disclosure, for example, a "command", an "instruction", "control information", a "message", "information", "data", a "packet", a "data packet", "intent", and/or a "signal", transmitted and received between first electronic device (s) and second electronic device(s), may include the scope or a detailed electrical expression (e.g., a digital code/an analog physical quantity) capable of being recognized by humans irrespective of the expression or may refer to itself. It may be obvious to those skilled in the art to which the disclosure pertains that the listed exemplary expressions may be interpreted in various manners according to the used context. "A is greater than B" in the disclosure may include the meaning "A is greater than or equal to B" as well as the meaning "A is greater than B".

Terms used in the disclosure are used to describe specified embodiments and are not intended to limit the scope of another embodiment. The terms of a singular form may include plural forms unless the context clearly indicates otherwise. All the terms used herein, which include technical or scientific terms, may have the same meaning that is generally understood by a person skilled in the art described in the disclosure. Terms, which are defined in a general dictionary, among terms used in the disclosure may be interpreted as the same or similar meaning to the meaning on context in the related art and are not interpreted as an idealized or overly formal meaning unless expressly so defined in the disclosure. In some cases, even if terms are terms which are defined in the disclosure, they may not be interpreted to exclude embodiments of the disclosure.

FIG. 1 is a drawing about a sarcopenia prediction system according to an embodiment of the disclosure.

Referring to FIG. 1, an electronic device 150 according to an embodiment of the disclosure may communicate with another external electronic device over a network.

According to an embodiment of the disclosure, the electronic device 150 may receive input data associated with a subject from the outside and may predict sarcopenia of the subject. According to an embodiment of the disclosure, the input data may include information associated with an age, a gender, an eye image, a fundus image, a slit lamp examination image, and the like of the subject.

According to an embodiment of the disclosure, the electronic device 150 may identify a possibility of sarcopenia based on the input data.

According to an embodiment of the disclosure, a database 240 may store various pieces of information input from an external device. For example, the database 240 may store an age of the subject, a gender of the subject, an image obtained by capturing an eyeball of the subject (hereinafter referred to as an "eye image"), an image obtained by capturing a fundus of the subject (hereinafter referred to as a "fundus image"), an image obtained by means of slit lamp examination (hereinafter referred to as a "slit lamp examination image"), and the like.

According to an embodiment of the disclosure, a processor 270 may perform data processing or the like for performing an operation of learning and determining a model associated with predicting the onset of sarcopenia which will be described below. According to an embodiment of the disclosure, the processor 270 may learn the model associated with predicting the onset of sarcopenia which will be described below and may generate the result of predicting the onset of the sarcopenia using the model associated with predicting the onset of the sarcopenia.

As such, the electronic device 150 according to an embodiment of the disclosure may save human, social, and economic costs and an inspection time while minimizing an examination for predicting sarcopenia and may provide a sarcopenia treatment strategy capable of immediately coping with the onset of sarcopenia.

Figure 2:
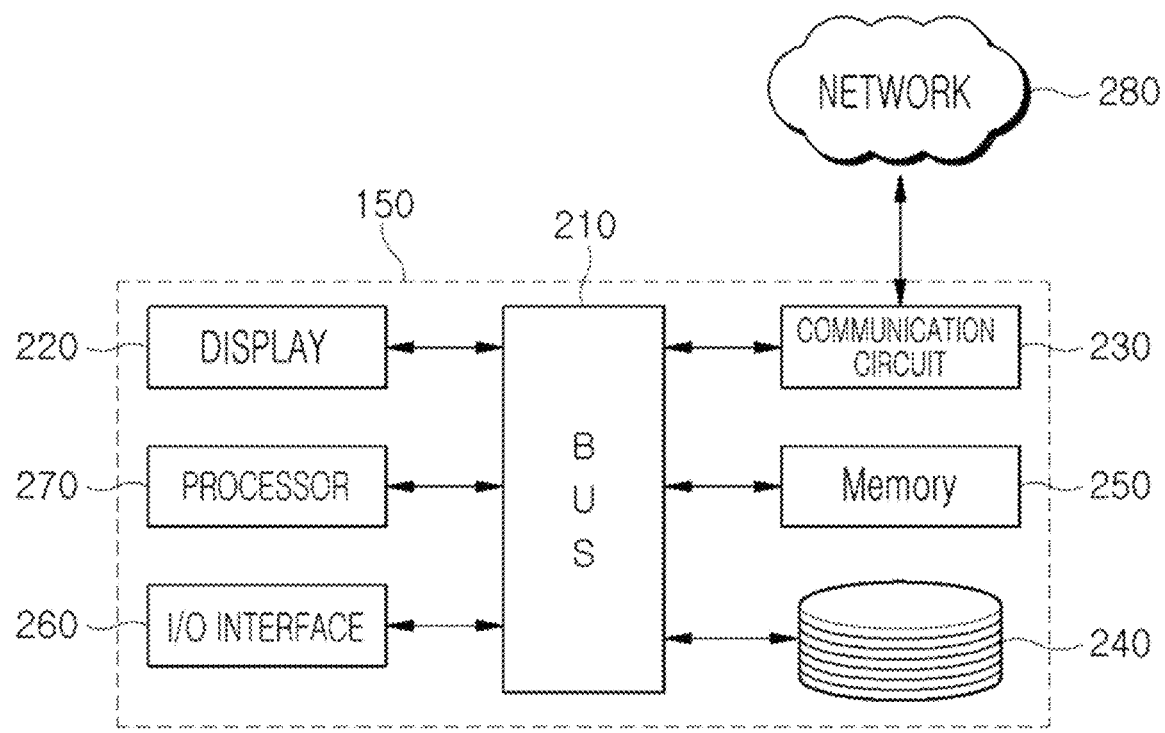
FIG. 2 is a block diagram illustrating a configuration of an electronic device according to an embodiment of the disclosure.

FIG. 2 is a block diagram illustrating a configuration of an electronic device according to an embodiment of the disclosure.

As shown in FIG. 2, an electronic device 150 may include a bus 210, a display 220, a communication circuit 230, a database 240, a memory 250, an input/output (I/O) interface 260, and a processor 270. In another embodiment, the electronic device 150 may exclude at least one of the components or may additionally include another component.

For reference, the components 210, 220, 230, 240, 250, 260, and 270 of the electronic device 150, which are shown in FIG. 2, are only exemplary components for describing an operation method of the electronic device 150 according to an embodiment of the disclosure. In other words, it is obvious that the electronic device 150 according to an embodiment of the disclosure is able to additionally include another component other than the shown components.

The bus 210 may electrically connect the components 220 to 270. The bus 210 may include a circuit for communication (e.g., a control message and/or data) between the components 220 to 270.

The display 220 may display text, an image, a video, an icon, a symbol, or the like configuring various pieces of content. The display 220 may include a touch screen and may receive a touch, a gesture, proximity, or a hovering input using an electronic pen or a part of the user's body.

For example, the display 220 may include a liquid crystal display (LCD), a light emitting diode (LED) display, an organic LED display, a microelectromechanical systems (MEMS) display, or an electronic paper display. The display 220 may be implemented to be included in the electronic device 150 or may be implemented independently of the electronic device 150, which may be operatively connected with the electronic device 150.

The communication circuit 230 may establish a communication channel between the electronic device 150 and external devices. The communication circuit 230 may access a network 280 through wireless communication or wired communication to communicate with the external devices.

The database 240 may be implemented on the memory 250 or may be implemented on a separate storage medium. The database 240 may store all of contents, details, or the like of data transmitted and received with the external device. The data stored in the database 240 may be updated constantly at a predetermined period.

According to an embodiment of the disclosure, the database 240 may store various pieces of information input from the external device. For example, the database 240 may store an age of a patient, a gender of the patient, a refractive power (e.g., a myopia degree, an astigmatism value, or the like) before vision correction surgery of the patient, a vision correction surgery type (e.g., such as laser epithelial keratomileusis/photorefractive keratectomy (LASEK/PRK), laser in situ keratomileusis (LASIK), small incision lenticule extraction (SMILE), or the like) of the patient, intraocular pressure (IOP) before the vision correction surgery of the patient, a central corneal thickness (CCT) before the vision correction surgery of the patient, an anterior chamber depth (ACD) before the vision correction surgery of the patient, an expected amount of cut in the vision correction surgery of the patient, fundus photography, and the like.

According to various embodiments, because the data stored in the database 240 is information sensitive to a subject, it may be distributed and stored in a blockchain network to improve security about use of the pieces of information. When the database 240 is distributed and stored in the blockchain network, a history of transmitting, modifying, deleting, or adding information included in the database 240 may be more securely managed in the blockchain network.

The memory 250 may include a volatile and/or non-volatile memory. The memory 250 may store a command or data associated with at least one other component of the electronic device 150. For example, the memory 250 may store instructions, when executed, causing the processor 270 to perform various operations described in the specification. As an example, the instructions may be included in a package file of an application program.

The I/O interface 260 may serve to deliver a command or data, input from a user or another external device, to another component of the electronic device 150. The I/O interface 260 may be implemented with hardware or software and may be used as the concept including a user interface (UI) and a port for communication with another external device.

The processor 270 may include at least one or more of a central processing unit (CPU), an application processor (AP), or a communication processor (CP). The processor 270 may be electrically connected with the memory 250, the display 220, and the communication circuit 230 through the bus 210 and may execute calculation or data processing about control and/or communication of other components depending on instructions, a program, or software stored in the memory 250, during its operation. Thus, the execution of the instructions, the application program, or the software may be understood as an operation of the processor 270.

According to an embodiment of the disclosure, the processor 270 may perform data processing or the like for performing an operation of learning and predicting a model associated with predicting sarcopenia which will be described below. According to an embodiment of the disclosure, the processor 270 may learn the model associated with predicting sarcopenia which will be described below and may generate the result of predicting the sarcopenia using the model associated with predicting the sarcopenia.

The network 280 may include at least one of a telecommunications network, a computer network, the Internet, or a telephone network. A wireless communication protocol for accessing the network 280 may use at least one of, for example, long-term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), or a 5th generation (5G) standard communication protocol. However, this is illustrative, and various wired and wireless communication technologies applicable in the technical field may be used according to an embodiment to which the disclosure is applied.

As such, the electronic device 150 according to an embodiment of the disclosure may predict sarcopenia while minimizing an examination to observe the sarcopenia to reduce costs and time and may identify a high-risk patient with the sarcopenia to provide a subject with a customized treatment strategy.

Figure 3:
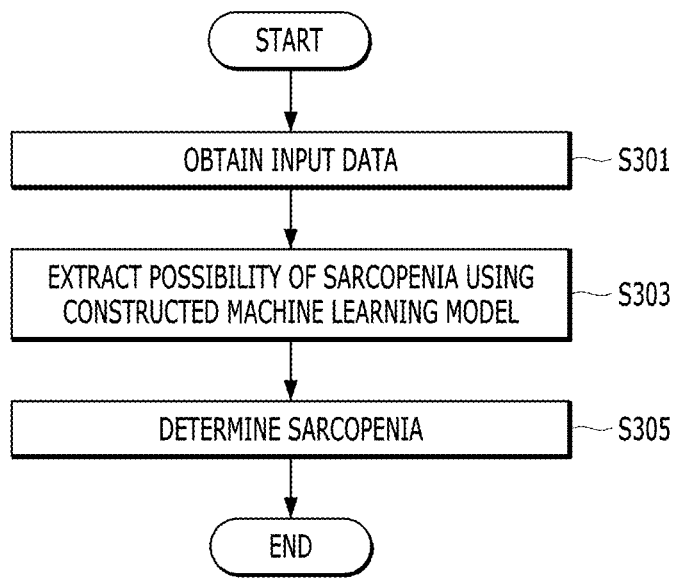
FIG. 3 is a flowchart illustrating an operation of an electronic device according to an embodiment of the disclosure.

FIG. 3 is a flowchart illustrating an operation of an electronic device 150 according to an embodiment of the disclosure.

In operation S301, the electronic device 150 may collect input data from the outside. The input data may include an eye image, a fundus image, a slit lamp examination image, and subject information of a subject (e.g., an age of the subject, a gender of the subject, a body mass index (BMI) of the subject, an area of residence of the subject, whether the subject smokes, whether the subject is drinking, whether the subject is diabetic, whether the subject has high blood pressure, whether the subject had corrective surgery, or the like). According to various embodiments of the disclosure, the electronic device 150 may internally collect input data.

In operation S303, the electronic device 150 may predict the onset of sarcopenia of the subject using a constructed machine learning model. The machine learning model will be described below.

In operation S305, the electronic device 150 may determine whether sarcopenia of the subject occurs based on the predicted sarcopenia onset prediction value.

Figure 4:
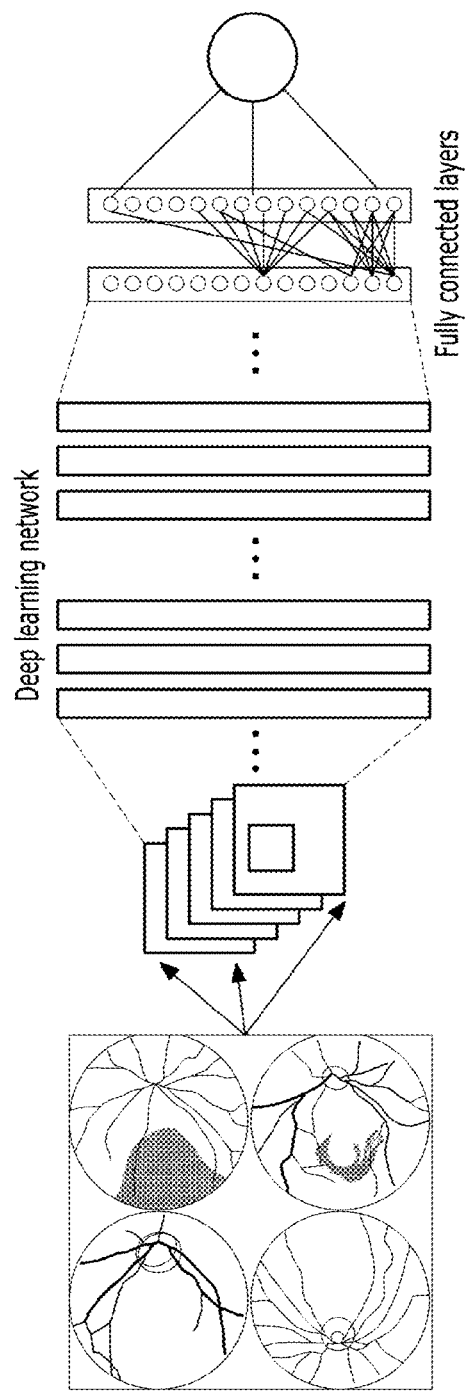
FIG. 4 is a conceptual diagram illustrating an operation of an electronic device according to an embodiment of the disclosure.

FIG. 4 is a conceptual diagram illustrating an operation of an electronic device according to an embodiment of the disclosure.

The machine learning model according to an embodiment of the disclosure may include a neural network for analyzing an eye image, a fundus image, a slit lamp examination image. According to an embodiment of the disclosure, the neural network may be composed of a set of node units connected with each other. A plurality of nodes refer to a plurality of neurons. According to an embodiment of the disclosure, the nodes constituting the neural network may be connected by one or more links. In the neural network, one or more nodes connected through the link may form a relationship between an input node and an output node.

In the relationship between the input node and the output node connected through one link, a value of data of the output node may be determined according to data input to the input node. According to an embodiment of the disclosure, the link which connects the input node with the output node may have a weight. The weight may be variable. Furthermore, the neural network according to an embodiment of the disclosure may vary a weight by a user or a certain algorithm to predict sarcopenia. For example, when one or more input nodes are connected with one output node through the link, the output node may determine an output node value based on values input to input nodes connected with the output node and a weight set in the link corresponding to the respective input nodes.

According to an embodiment of the disclosure, the performance of the neural network may be determined according to the number of nodes and links in the neural network, a correlation between the nodes and the links, or a value of the weight assigned to each of the links. For example, when the number of nodes and the number of links are identical to each other and when a weight value of the link is present in different neural networks, two neural networks may be recognized as being different from each other.

The neural network may be composed of a set of a plurality of nodes, and a subset of nodes constituting the neural network may be referred to as a layer. Some of the nodes constituting the neural network may constitute a layer, based on a distance formed from a specific input node. For example, a set of a plurality of nodes with a distance of "n" from the specific input node may constitute an "n"-layer. The distance from the specific input node refers to the number of links which should pass to be reached from the specific input node to the node. However, the definition of such a layer is only an embodiment, but not limited thereto.

According to an embodiment of the disclosure, in the neural network, the number of nodes included in the input layer may be the same as the number of nodes included in the output layer. In the neural network according to another embodiment of the disclosure, the number of nodes included in the input layer may be different from the number of nodes included in the output layer.

A deep neural network (DNN) refers to a neural network including at least one or more hidden layers as well as an input layer and an output layer. Latent structures of data may be identified using the DNN. For example, latent structures of fundus photography (e.g., whether there is a specific pattern, what the retinal nerve looks like, whether the pigment layer is thin, or the like) may be identified using the DNN. The DNN may include a convolutional neural network, a recurrent neural network, a generative adversarial network, an auto encoder, a deep belief network (DBN), or the like. However, this is illustrative, but not limited thereto.

The neural network may be learned in at least one of supervised learning, unsupervised learning, semi supervised learning, or reinforcement learning. The learning of the neural network may be a process of applying information (or data) for the neural network to predict sarcopenia to the neural network and constructing a specific model.

The neural network may be learned based on training data such that an output error is minimized. The neural network may repeatedly receive training data and may calculate an error between the output of the neural network and target data based on the training data. To reduce the calculated error, the neural network may perform backpropagation of the error of the neural network in a direction from an output layer (or an output node) of the neural network to an input layer (or an input node) of the neural network and may update a weight of each node of the neural network.

For supervised learning, the neural network may use training data (or labeling data) where each training data is labeled with a correct answer value. For unsupervised learning, in the neural network, each training data may fail to be labeled with a correct answer. For example, the training data used for supervised learning about data classification may be data where each of the training data is labeled with a category. The neural network may receive labeling data and may compare the output of the neural network with the label of the training data to calculate an error. For another example, the neural network may calculate an error while comparing training data which is an input used for unsupervised learning about data classification with the output of the neural network. The calculated error may be propagated in a reverse direction in the neural network. The neural network may update a weight corresponding to the link of the respective nodes included in each layer of the neural network depending on backpropagation. The amount of change in the updated connection weight of each node may be determined according to a learning rate. The calculation of the neural network for the input data and the backpropagation of the error may constitute a learning cycle. The learning rate may be applied differently according to the number of times the learning cycle of the neural network is repeated.

The training data may be generally a subset of actual data (i.e., eye images, fundus images, slit lamp examination images to be processed using the learned neural network or the like) in the learning of the neural network. Although the error for the training data is reduced, there is the case where an error increases in the actual data. Overfitting is a phenomenon where it is overlearned from the training data and an error increases in actual data. Overfitting acts as a cause of increasing errors in a machine learning algorithm.

An electronic device 150 of FIG. 2 according to an embodiment of the disclosure may use a method such as regularization for increasing training data to prevent overfitting, dropout for deactivating some of nodes of the network in the learning process, or batch normalization layer.

Figure 5A:
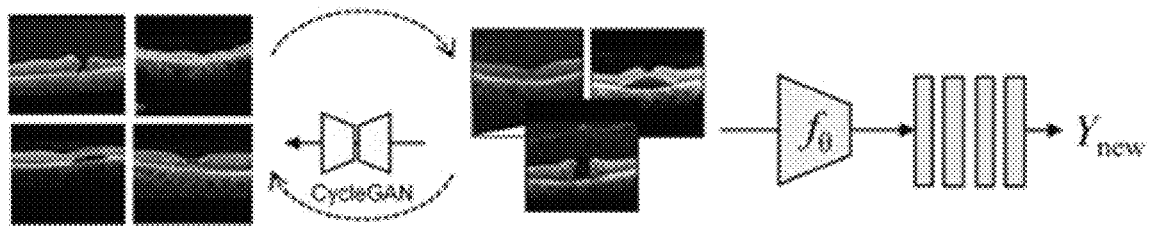
FIG. 5A is a conceptual diagram illustrating an operation of an electronic device according to an embodiment of the disclosure.
Figure 5B:
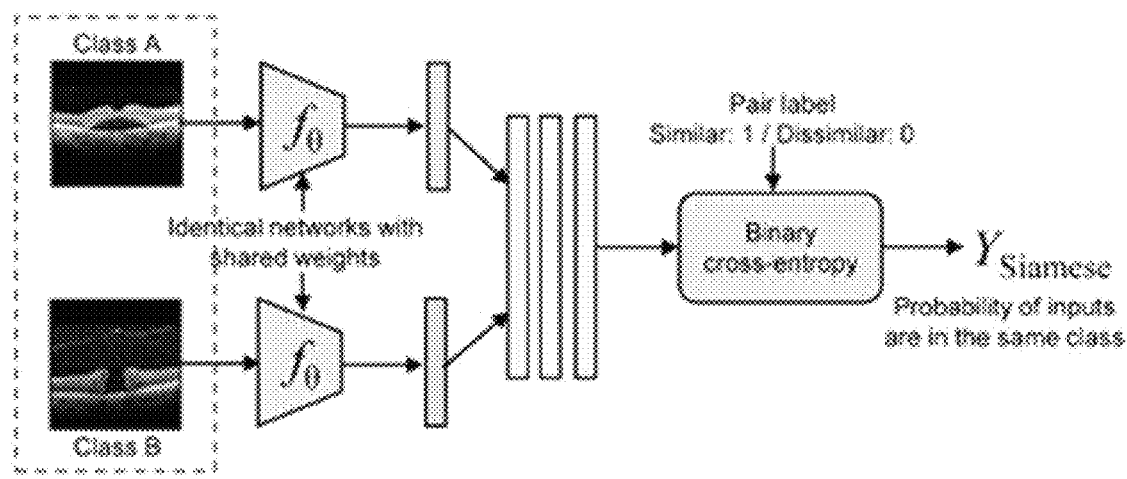
FIG. 5B is a conceptual diagram illustrating an operation of an electronic device according to an embodiment of the disclosure.
Figure 5C:
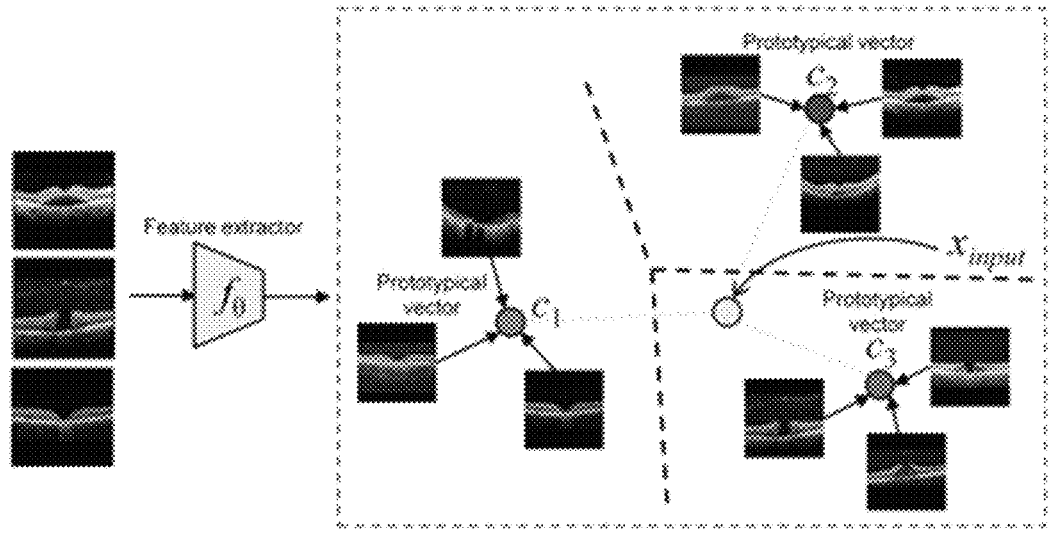
FIG. 5C is a conceptual diagram illustrating an operation of an electronic device according to an embodiment of the disclosure.

FIG. 5A to FIG. 5C is a conceptual diagram illustrating an operation of an electronic device according to an embodiment of the disclosure.

Referring to FIG. 5A, the electronic device 150 may classify and store eye images, fundus images, slit lamp examination images, etc. into a plurality of classes according to preset criteria in a database 240 with a plurality of sample data belonging to a specific domain. For example, the domain may be classified as an eye image, the type as Mariginal Reflex Distance 1 (hereinafter referred to as $MRD_1$), and the cluster as $MRD_1$ value. However, this is an example and is not limited thereto. Sample data can be used for machine learning later.

According to an embodiment of the disclosure, the electronic device 150 may utilize a data augmentation technique to increase the number of sample data. According to an embodiment of the disclosure, the electronic device 150 may secure tens of thousands of new sample data by utilizing generative adversarial networks (GANs) and data synthesis of the sample data stored in the database 240.

According to an embodiment of the disclosure, the electronic device 150 performs clustering on the sample data for each type stored in the database 240 to determine the number of clusters per class k (k is a natural number) and feature values corresponding to each sample data. value) can be extracted. The electronic device 150 varies the number k of learning data for each type based on the number k of clusters for each type, selects k sample data representing each type based on the feature value for each type, and then outputs k sample data for each selected type. It can be used as learning data.

Referring to FIG. 5B, according to an embodiment of the disclosure, the electronic device 150 may calculate a difference between sample data classified as type A and sample data classified as type B. According to an embodiment of the present invention, the difference between data may be expressed as a Euclidean distance.

According to an exemplary embodiment of the disclosure, the electronic device 150 may classify data located within a certain Euclidean distance as homogeneous data based on the extracted feature value.

Referring to FIG. 5C, when the feature values extracted as a result of machine learning exist C1, C2, and C3, the electronic device 150 calculates the feature value of the input data (Xinput), and the feature value of the input data is C1, After confirming that C2 and C3 are closest to the C3 feature value, the input data can be classified into a type corresponding to the C3 feature value.

As described above, the electronic device 150 may determine similarity with respect to the sample data and build a machine learning model.

Figure 6A:
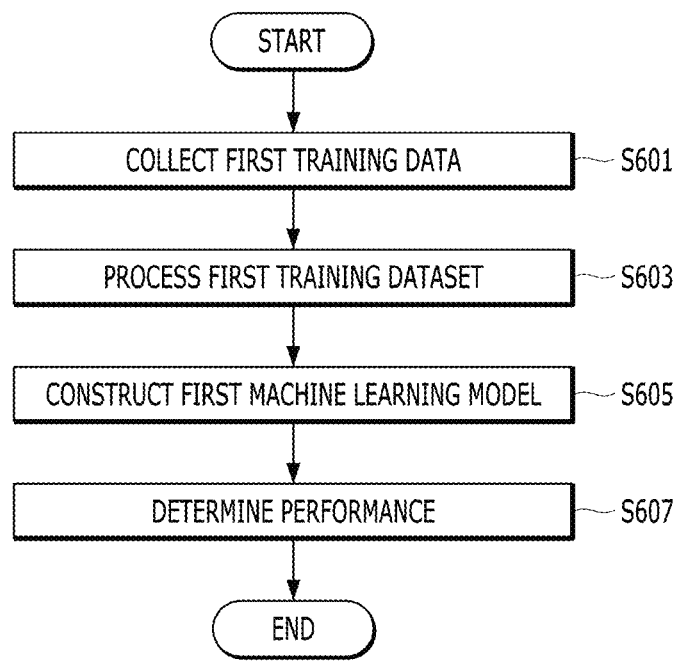
FIG. 6A is a flowchart illustrating an operation of an electronic device according to an embodiment of the disclosure.

FIG. 6A is a flowchart illustrating an operation of an electronic device according to an embodiment of the disclosure. Particularly, in FIG. 6A, an operation of the electronic device 150 for constructing a first machine learning model is illustrated according to an embodiment of the disclosure.

In operation S601, the electronic device 150 may collect first training data. According to an embodiment of the disclosure, the electronic device 150 may receive the first training data from the outside. According to another embodiment of the disclosure, the electronic device 150 may internally collect data for training. The first training data for constructing the first machine learning model may be fundus images corresponding to a plurality of subjects. According to another embodiment of the disclosure, the electronic device 150 may collect the first training data using data augmentation, GAN based on the fundus images stored the database 240.

According to an embodiment of the disclosure, the first training data for constructing the first machine learning model may be optical coherence tomography images (hereinafter referred to as an "OCT images") corresponding to a plurality of subjects. The electronic device 150 may collect the first training data using data augmentation, GAN based on the OCT images stored the database 240.

In operation S603, the electronic device 150 may process a first training dataset based on the first training data. According to an embodiment of the disclosure, the electronic device 150 may classify each of the first training data into domains, types, and clusters. For example, the electronic device 150 may classify the domain of the first training data into fundus images. The electronic device 150 may classify the type of the first training data into macular degeneration. The electronic device 150 may classify the cluster of the first training data into whether or not macular degeneration.

This is only one example, and is not limited thereto. The electronic device 150 may create the first training dataset by classifying the sample data into domains, types, and clusters as described above.

In operation S605, the electronic device 150 may construct the first machine learning model for predicting sarcopenia using fundus images (and/or OCT images) of a subject based on the first training dataset.

In operation S607, the electronic device 150 may determine performance of the first machine learning model. According to an embodiment of the disclosure, the electronic device 150 may compare data output using the first machine learning model with the first training data to calculate an error. The electronic device 150 may periodically calculate the error and may determine the performance of the first machine learning model.

Although not illustrated in the drawing, the electronic device 150 may update the first machine learning model in the direction of reducing the calculated error.

Figure 6B:
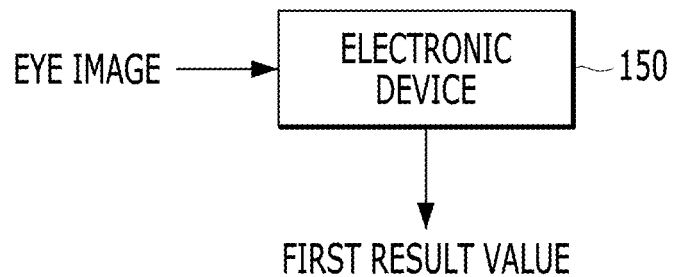
FIG. 6B is a conceptual diagram illustrating an operation of an electronic device according to an embodiment of the disclosure.

FIG. 6B is a conceptual diagram illustrating an operation of an electronic device according to an embodiment of the disclosure.

According to an embodiment of the disclosure, the electronic device 150 may extract a value (or a first result value) where sarcopenia is predicted using a first machine learning model constructed for fundus images (and/or OCT images). According to an embodiment of the disclosure, the first result value may include a value (e.g., '1' if it has occurred, '0' if it has not occurred) for whether macular degeneration corresponding to the fundus image (and/or the OCT image) occurs and a value (e.g., '1' if it has occurred, '0' if it has not occurred) for whether retinopathy corresponding to the fundus image (and/or the OCT image) occurs.

According to an embodiment of the disclosure, the electronic device 150 may adjust the color of the acquired fundus images. In addition, the electronic device 150 may perform a preprocessing operation of displaying drusen segmentation on the fundus images. In this way, the electronic device 150 may utilize the preprocessed data as training data of the first machine learning model. The first machine learning model may predict macular degeneration or ischemic change based on the drusen area, and determine whether sarcopenia is present based on the predicted degree of macular degeneration or ischemic change.

As described above, according to an embodiment of the disclosure, the first machine learning model determines the subject's degree of foreign matter located in the retinal blood vessels, macular degeneration, ischemic change, etc. based on the subject's fundus image (and/or OCT image). of sarcopenia can be predicted.

According to an embodiment of the present invention, the electronic device 150 may determine whether the subject has sarcopenia based on the first result value.

Figure 7A:
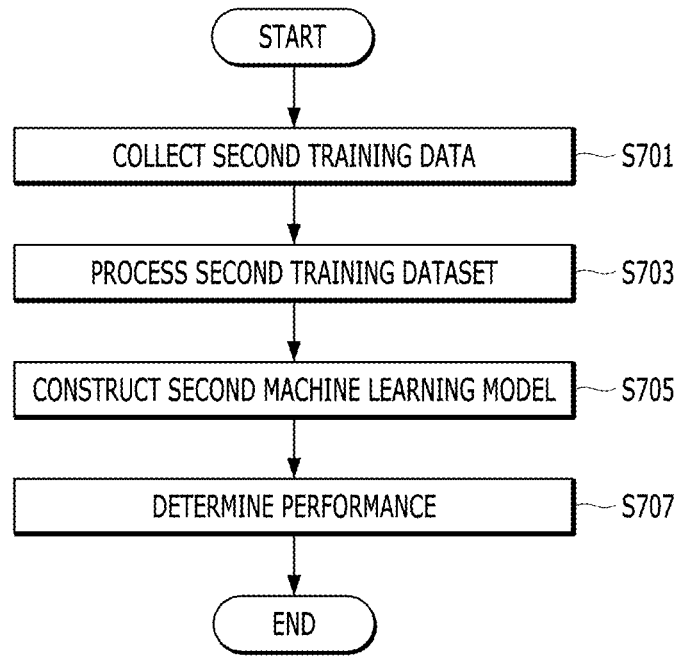
FIG. 7A is a flowchart illustrating an operation of an electronic device according to an embodiment of the disclosure.

FIG. 7A is a flowchart illustrating an operation of an electronic device according to an embodiment of the disclosure. Particularly, in FIG. 7A, an operation of the electronic device 150 for constructing a second machine learning model is illustrated according to an embodiment of the disclosure.

In operation S701, the electronic device 150 may collect second training data. According to an embodiment of the disclosure, the electronic device 150 may receive the second training data from the outside. According to another embodiment of the disclosure, the electronic device 150 may internally collect data for training. The second training data for constructing the second machine learning model may be eye images corresponding to a plurality of subjects. According to another embodiment of the disclosure, the electronic device 150 may collect the second training data using data augmentation, GAN based on the eye images stored the database 240.

In operation S703, the electronic device 150 may process a second training dataset based on the second training data. According to an embodiment of the disclosure, the electronic device 150 may classify each of the second training data into domains, types, and clusters. For example, the electronic device 150 may classify the domain of the second training data into eye images. The electronic device 150 may classify the type of the second training data into $MRD_1$ (or levator palpebrae superioris, an eye closing speed, an eye opening speed, $MRD_2$). The electronic device 150 may classify the cluster of the second training data into $MRD_1$ value (or levator palpebrae superioris value, an eye closing speed value, an eye opening speed value, $MRD_2$ value).

This is only one example, and is not limited thereto. The electronic device 150 may create the second training dataset by classifying the sample data into domains, types, and clusters as described above.

In operation S705, the electronic device 150 may construct the second machine learning model for predicting sarcopenia using eye images of a subject based on the second training dataset.

In operation S707, the electronic device 150 may determine performance of the second machine learning model. According to an embodiment of the disclosure, the electronic device 150 may compare data output using the second machine learning model with the second training data to calculate an error. The electronic device 150 may periodically calculate the error and may determine the performance of the second machine learning model.

Although not illustrated in the drawing, the electronic device 150 may update the second machine learning model in the direction of reducing the calculated error.

Figure 7B:
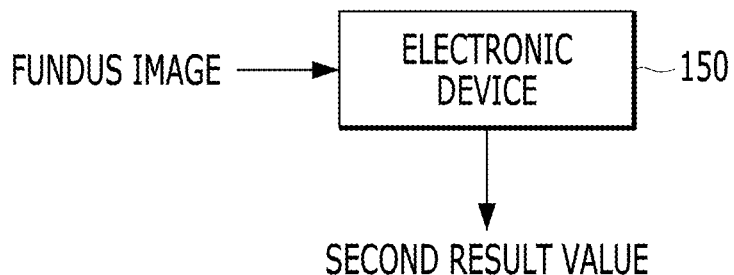
FIG. 7B is a conceptual diagram illustrating an operation of an electronic device according to an embodiment of the disclosure.

FIG. 7B is a conceptual diagram illustrating an operation of an electronic device according to an embodiment of the disclosure.

According to an embodiment of the disclosure, the electronic device 150 may extract a value (or a second result value) where sarcopenia is predicted using the second machine learning model constructed for eye images. According to an embodiment of the disclosure, the second result value may may include an $MRD_1$ value of the subject corresponding to the eye image, an upper eyelid edge location change value, an eye closing speed value, and an eye opening speed value, the $MRD_1$ value being a distance where light is reflected from an upper eyelid edge to a cornea of the subject.

According to an embodiment of the present invention, the electronic device 150 may determine whether the subject has sarcopenia based on the first result value and the second result value.

Figure 8A:
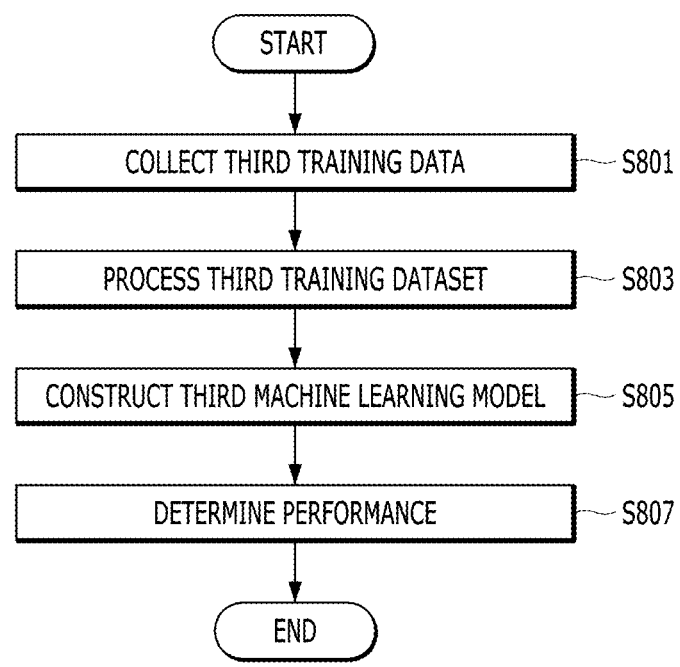
FIG. 8A is a flowchart illustrating an operation of an electronic device according to an embodiment of the disclosure.

FIG. 8A is a flowchart illustrating an operation of an electronic device according to an embodiment of the disclosure. Particularly, in FIG. 8A, an operation of the electronic device 150 for constructing a third machine learning model is illustrated according to an embodiment of the disclosure.

In operation S801, the electronic device 150 may collect third training data. According to an embodiment of the disclosure, the electronic device 150 may receive the third training data from the outside. According to another embodiment of the disclosure, the electronic device 150 may internally collect data for training. The third training data for constructing the third machine learning model may be slit lamp examination images corresponding to a plurality of subjects. According to another embodiment of the disclosure, the electronic device 150 may collect the third training data using data augmentation, GAN based on the eye images stored the database 240.

In operation S803, the electronic device 150 may process a third training dataset based on the third training data. According to an embodiment of the disclosure, the electronic device 150 may classify each of the third training data into domains, types, and clusters. For example, the electronic device 150 may classify the domain of the third training data into slit lamp examination images. The electronic device 150 may classify the type of the third training data into pterygium (or cataract). The electronic device 150 may classify the cluster of the third training data into a value for whether pterygium corresponding to the slit lamp examination image occurs and a value for whether cataract corresponding to the slit lamp examination image occurs This is only one example, and is not limited thereto. The electronic device 150 may create the third training dataset by classifying the sample data into domains, types, and clusters as described above.

In operation S805, the electronic device 150 may construct the third machine learning model for predicting sarcopenia using eye images of a subject based on the third training dataset.

In operation S807, the electronic device 150 may determine performance of the third machine learning model. According to an embodiment of the disclosure, the electronic device 150 may compare data output using the third machine learning model with the third training data to calculate an error. The electronic device 150 may periodically calculate the error and may determine the performance of the third machine learning model.

Although not illustrated in the drawing, the electronic device 150 may update the third machine learning model in the direction of reducing the calculated error.

Figure 8B:
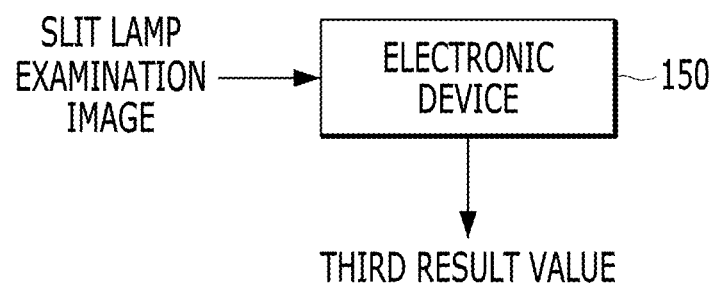
FIG. 8B is a conceptual diagram illustrating an operation of an electronic device according to an embodiment of the disclosure.

FIG. 8B is a conceptual diagram illustrating an operation of an electronic device according to an embodiment of the disclosure.

According to an embodiment of the disclosure, the electronic device 150 may extract a value (or a third result value) where sarcopenia is predicted using the third machine learning model constructed for slit lamp examination images. According to an embodiment of the disclosure, the third result value may include a value for whether pterygium corresponding to the slit lamp examination image occurs and a value for whether cataract corresponding to the slit lamp examination image occurs.

According to an embodiment of the present invention, the electronic device 150 may determine whether the subject has sarcopenia based on the first result value and the second result value and the third result value.

Figure 9:
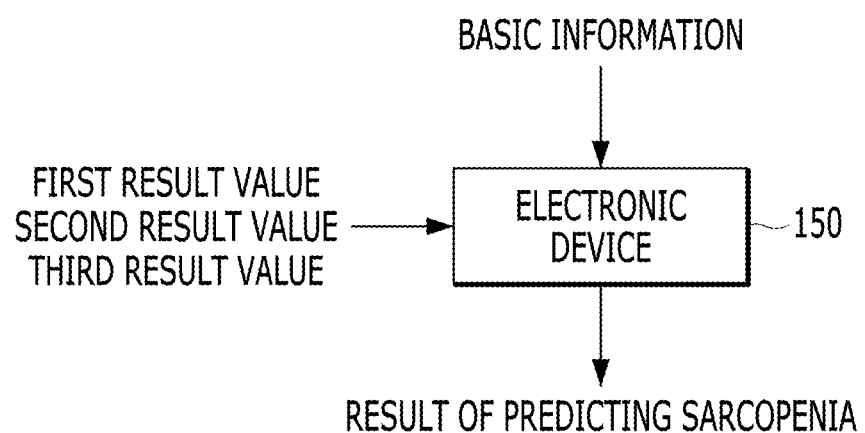
FIG. 9 is a conceptual diagram illustrating an operation of an electronic device according to an embodiment of the disclosure.

FIG. 9 is a conceptual diagram illustrating an operation of an electronic device 150 according to an embodiment of the disclosure.

The electronic device 150 may obtain basic information of a subject (e.g., an age of the subject, a gender of the subject, an area of residence of the subject, a job of the subject, whether the subject smokes, whether the subject is drinking, whether the subject is diabetic, whether the subject has high blood pressure, a BMI of the subject, whether the subject had vision correction surgery, or the like). Furthermore, as disclosed above, the electronic device 150 may extract first to third result values using first to third machine learning models.

According to an embodiment of the disclosure, the electronic device 150 may predict occurrence of sarcopenia of the subject in comprehensive consideration of the basic information of the subject and the first to third result values. For example, the electronic device 150 may set weights respectively corresponding to the first to third result values with regard to the basic information of the subject and may predict the occurrence of sarcopenia of the subject in comprehensive consideration of the weights respectively corresponding to the first to third result values.

As such, the electronic device 150 according to an embodiment of the disclosure may predict whether sarcopenia occurs using an eye image, a fundus image, a slit lamp examination image, and the like of the subject to save human and social costs and time and may provide a treatment strategy capable of immediately coping with the sarcopenia.

According to an embodiment of the disclosure, the electronic device 150 may analyze the subject's fundus image (and/or OCT image) to determine whether macular degeneration or retinopathy has occurred. When it is determined that macular degeneration or retinopathy has occurred by using the first machine learning model, the electronic device 150 may perform the following operations.

Figure 10A:
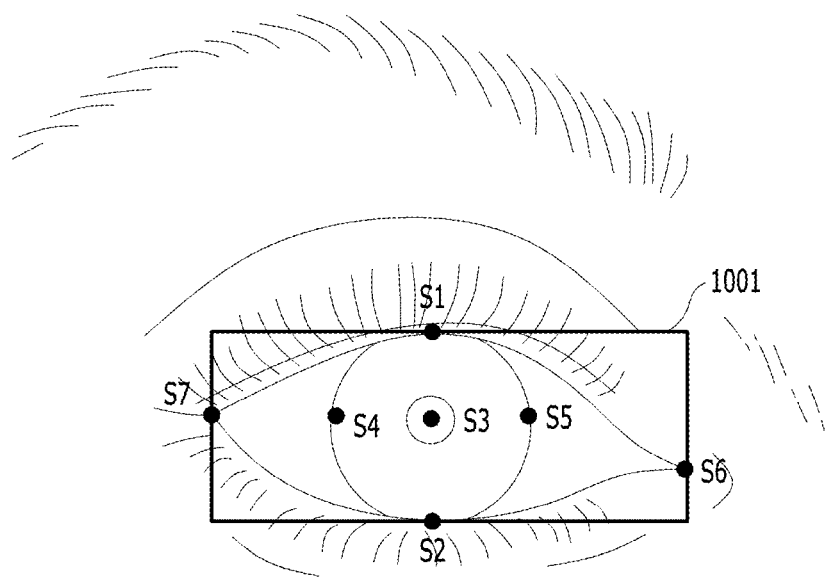
FIGS. 10A and 10B are conceptual diagrams illustrating an operation of an electronic device according to an embodiment of the disclosure.
Figure 10B:
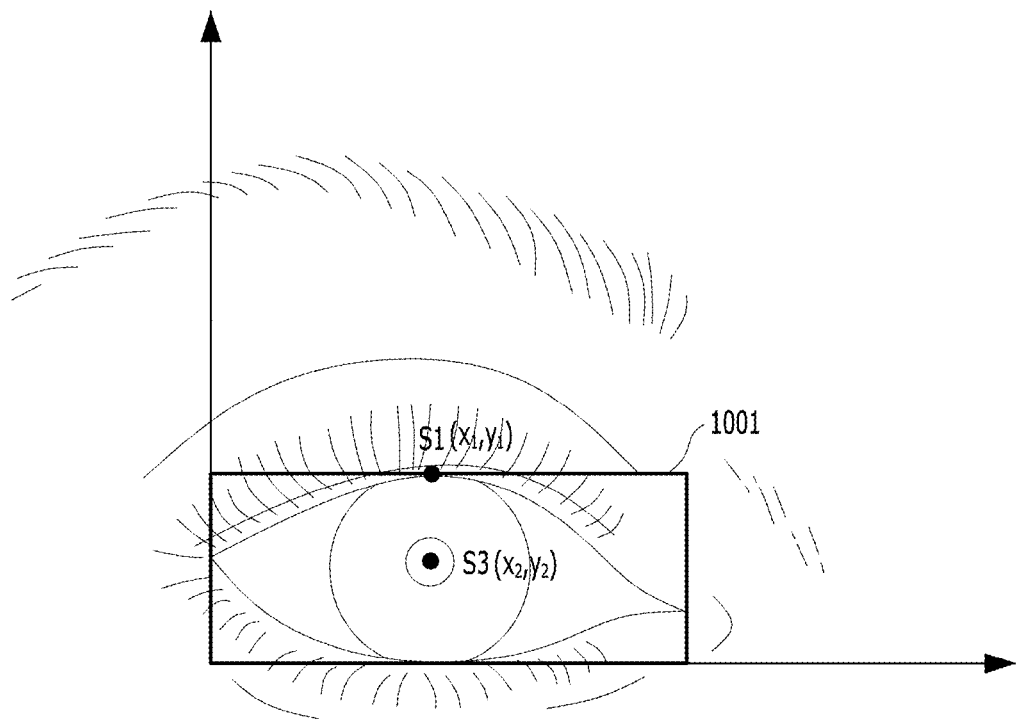

FIGS. 10A and 10B are conceptual diagrams illustrating an operation of an electronic device 150 according to an embodiment of the disclosure.

The electronic device 150 may extract a feature point from an obtained eye image of a subject. For example, the electronic device 150 may extract a feature point for an entity (e.g., an upper eyelid, a lower eyelid, medial canthus, lateral canthus, a cornea, an iris, a pupil, a conjunctiva, or the like) of the eyeball. The electronic device 150 may determine an eye area of the subject using the extracted feature point.

Referring to FIG. 10A, the electronic device 150 may extract entities S1 to S7 of the eyeball. The electronic device 150 may determine an eye area 1001 of the subject based on the extracted entities S1 to S7.

Referring to FIG. 10B, the electronic device 150 may identify coordinates of each of the location S1 of the upper eyelid and the location S3 of the pupil based on the determined eye area 1001. The electronic device 150 may identify first coordinates $(x_1, y_1)$ corresponding to S1 and second coordinates $(x_2, y_2)$ corresponding to S3, may calculate a difference between the identified first coordinates and the identified second coordinates, and may extract a distance where light is reflected from an upper eyelid edge to the cornea, that is, an $MRD_1$ value.

According to an embodiment of the disclosure, the electronic device 150 may compare the extracted $MRD_1$ value with a predetermined threshold to predict sarcopenia.

Figure 11A:
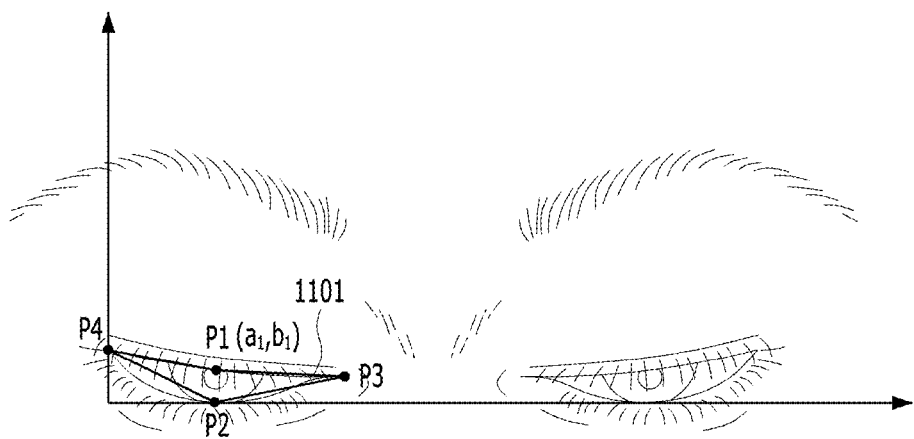
FIGS. 11A and 11B are conceptual diagrams illustrating an operation of an electronic device according to an embodiment of the disclosure.
Figure 11B:
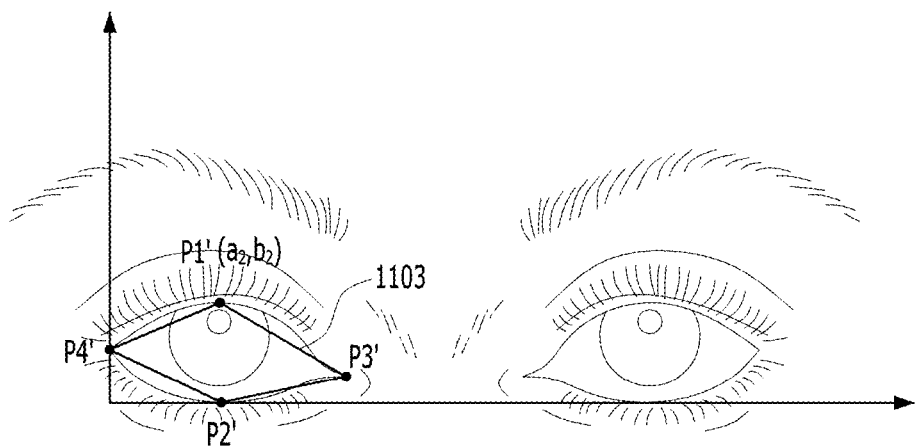

FIGS. 11A and 11B are conceptual diagrams illustrating an operation of an electronic device 150 according to an embodiment of the disclosure.

The electronic device 150 may extract a feature point from each of eye images at different time points. For example, the electronic device 150 may extract a feature point based on an entity of the eyeball from the eye image when the subject is looking down. Furthermore, example, the electronic device 150 may extract a feature point based on an entity of the eyeball from the eye image when the subject is looking up. The electronic device 150 may separately determine an eye area of the subject using each of feature points extracted at different time points.

Referring to FIG. 11A, the electronic device 150 may extract feature points for an upper eyelid edge P1, a lower eyelid edge P2, medial canthus P3, and lateral canthus P4 from an image where the subject is looking down. The electronic device 150 may determine an eye area 1101 corresponding to a first time point based on the extracted feature points. The electronic device 150 may identify first coordinates $(a_1, b_1)$ for a location of the upper eyelid edge P1 based on the eye area 1101.

Referring to FIG. 11B, the electronic device 150 may extract feature points for an upper eyelid edge P1', a lower eyelid edge P2', medial canthus P3', and lateral canthus P4' from an image where the subject is looking up. The electronic device 150 may determine an eye area 1103 corresponding to a second time point based on the extracted feature points. The electronic device 150 may identify second coordinates $(a_2, b_2)$ for a location of the upper eyelid edge P1' based on the eye area 1103.

According to an embodiment of the disclosure, the electronic device 150 may calculate an upper eyelid edge location change value using the first coordinates and the second coordinates.

According to an embodiment of the disclosure, the electronic device 150 may predict sarcopenia based on the calculated upper eyelid edge location change value and the $MRD_1$ value using the second machine learning model.

Figure 12A:
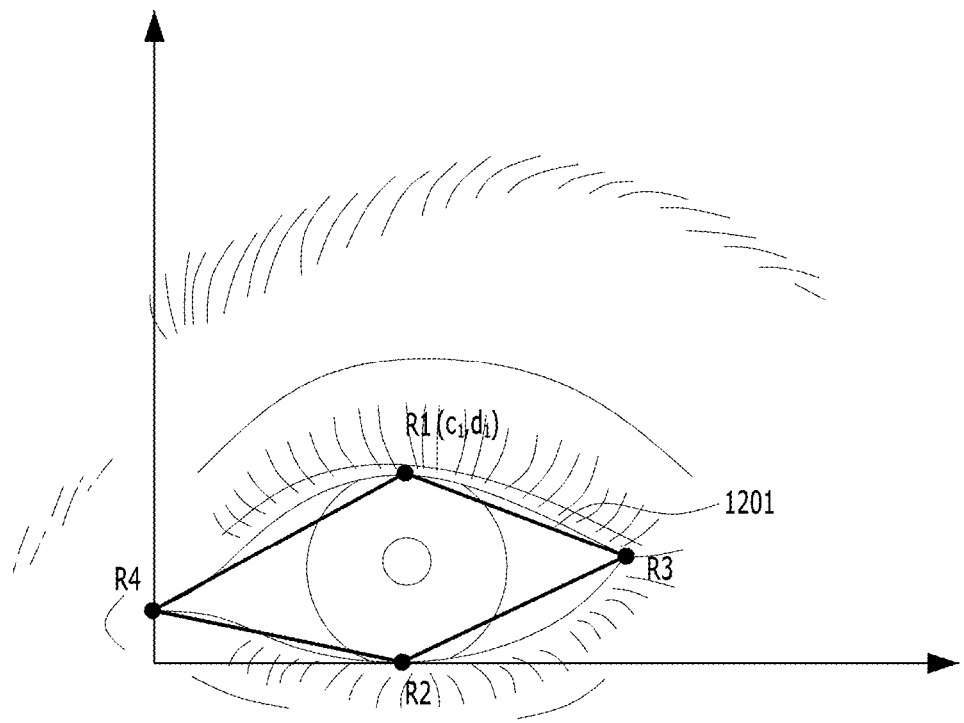
FIGS. 12A, 12B, and FIG. 12C are conceptual diagrams illustrating an operation of an electronic device according to an embodiment of the disclosure.
Figure 12B:
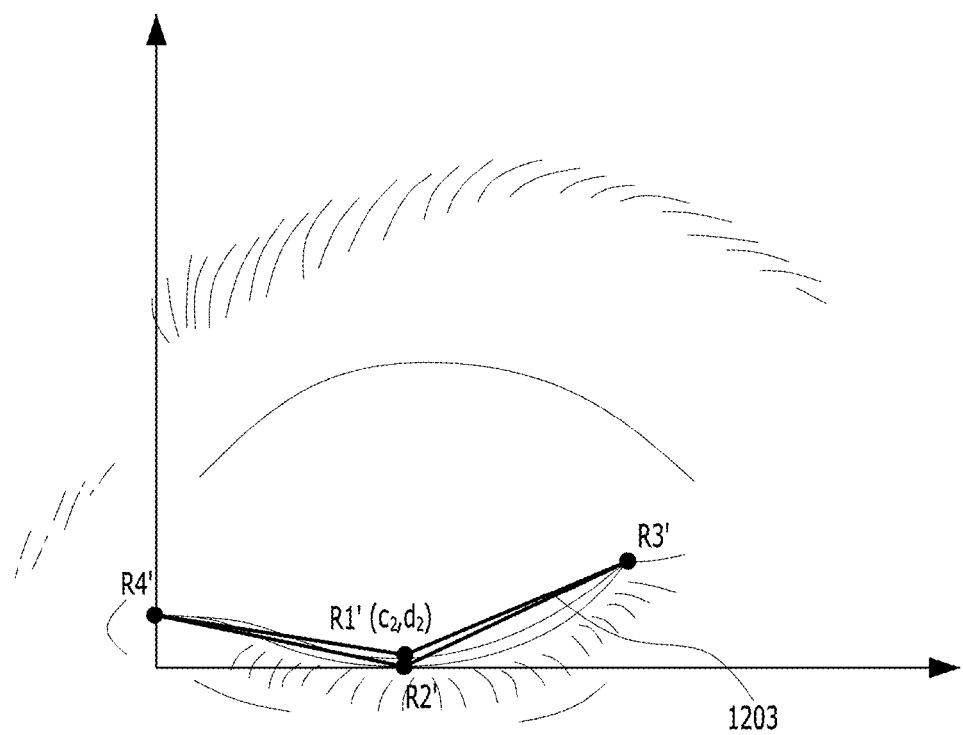
Figure 12C:
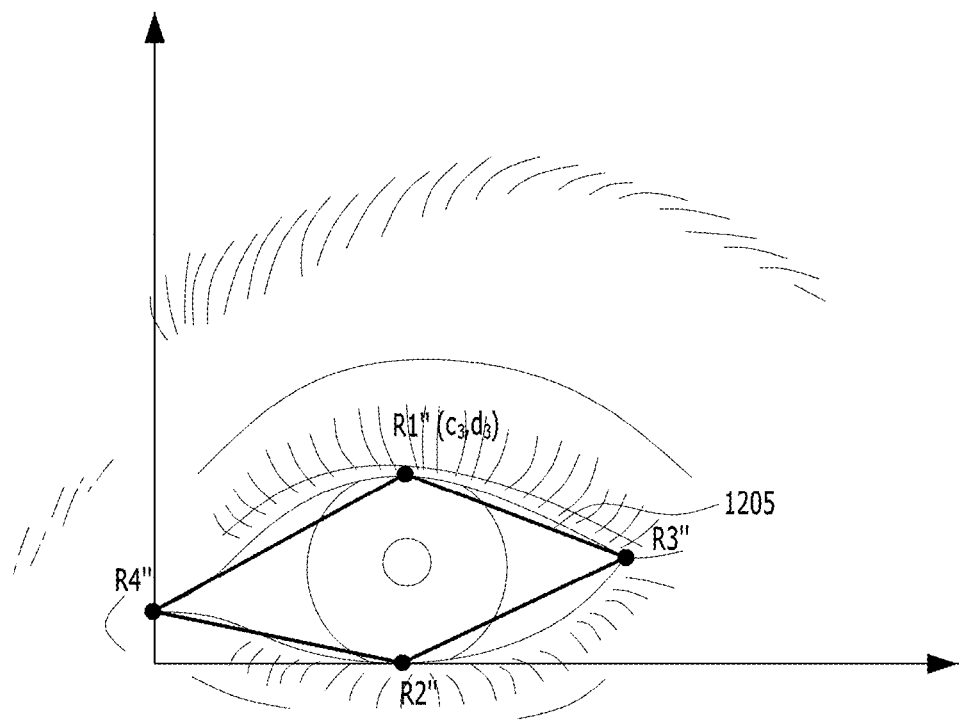

FIGS. 12A to 12C are conceptual diagrams illustrating an operation of an electronic device 150 according to an embodiment of the disclosure.

The electronic device 150 may extract a feature point from each of eye images at different time points. For example, the electronic device 150 may extract a feature point based on an entity of the eyeball from the eye image when a subject opens his or her eyes. Meanwhile, the electronic device 150 may extract a feature point based on an entity of the eyeball from the eye image when the subject closes the eyes. The electronic device 150 may separately determine an eye area of the subject using each of feature points extracted at different time points.

Referring to FIG. 12A, the electronic device 150 may extract feature points for an upper eyelid edge R1, a lower eyelid edge R2, lateral canthus R3, and medial canthus R4 from the eye image where the subject opens the eyes. The electronic device 150 may determine an eye area 1201 corresponding to a first time point based on the extracted feature points. The electronic device 150 may identify first coordinates $(c_1, d_1)$ for a location of the upper eyelid edge R1 based on the eye area 1201.

Referring to FIG. 12B, the electronic device 150 may extract feature points for an upper eyelid edge R1', a lower eyelid edge R2', lateral canthus R3', and medial canthus R4' from the eye image where the subject closes the eyes. The electronic device 150 may determine an eye area 1203 corresponding to a second time point based on the extracted feature points. The electronic device 150 may identify second coordinates ($c_2$, $d_2$) for a location of the upper eyelid edge R1' based on the eye area 1203.

The electronic device 150 may calculate a speed at which the subject closes the eyes using a difference between the first time point and the second time point, the first coordinates, and the second coordinates.

Referring to FIG. 12C, the electronic device 150 may extract feature points for an upper eyelid edge R1", a lower eyelid edge R2", lateral canthus R3", and medial canthus R4" from the eye image where the subject opens the eyes. The electronic device 150 may determine an eye area 1205 corresponding to a third time point based on the extracted feature points. The electronic device 150 may identify third coordinates ($c_3$, $d_3$) for a location of the upper eyelid edge R1" based on the eye area 1205.

The electronic device 150 may calculate a speed at which the subject opens the eyes using a difference between the second time point and the third time point, the second coordinates, and the third coordinates.

According to an embodiment of the disclosure, the electronic device 150 may predict sarcopenia based on the $MRD_1$ value, an upper eyelid edge location change value, the speed at which the subject closes the eyes, the speed at which the subject opens the eyes using the second machine learning model.

Figure 13:
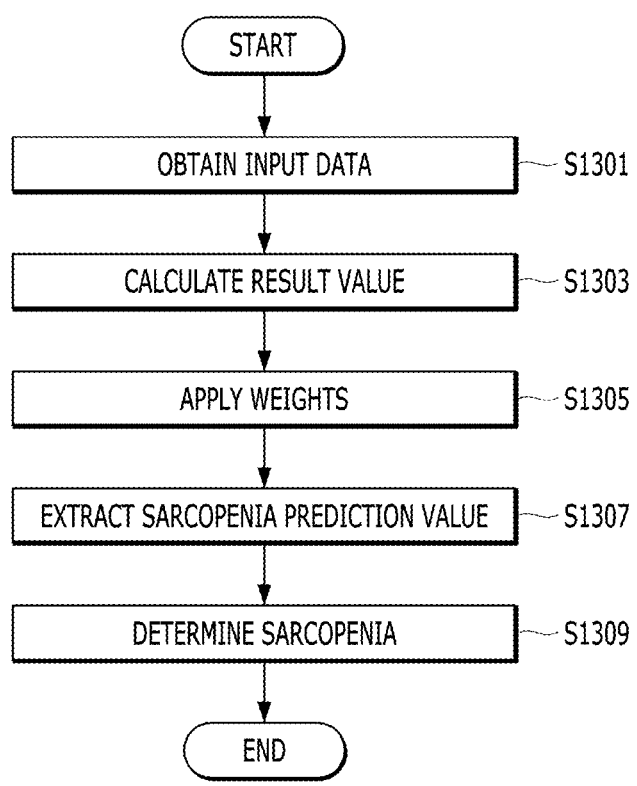
FIG. 13 is a flowchart illustrating an operation of an electronic device according to an embodiment of the disclosure.
Figure 14:
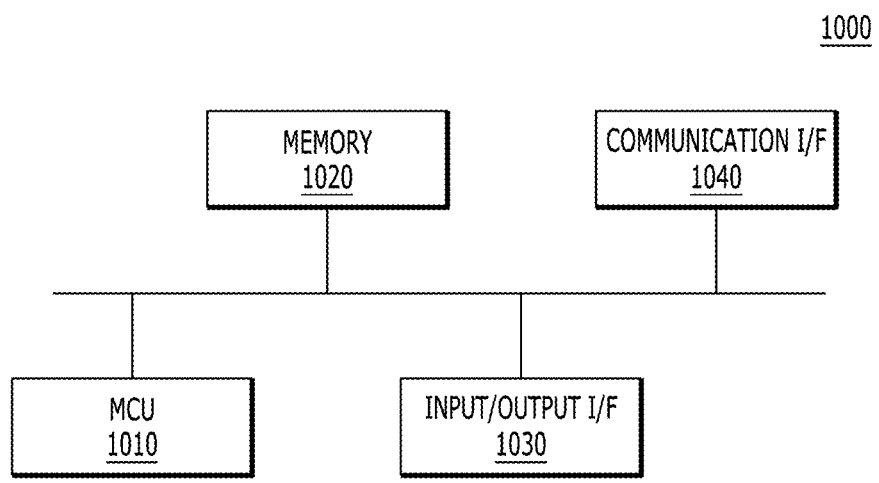
FIG. 14 is a block diagram illustrating a hardware configuration of an electronic device for predicting sarcopenia according to an embodiment of the disclosure.

FIG. 13 is a flowchart illustrating an operation of an electronic device 150 according to an embodiment of the disclosure.

In operation S1301, the electronic device 150 may obtain input data. The input data may include an eye image, a fundus image, a slit lamp examination image, basic information, and the like of a subject.

In operation S1303, the electronic device 150 may calculate first to third result values using first to third machine learning models.

In operation S1305, the electronic device 150 may separately apply different weights to the first to third result values based on the basic information of the subject.

In operation S1307, the electronic device 150 may reflect the weight applied for each result value to extract a sarcopenia prediction value.

In operation S1309, the electronic device 150 may compare the extracted sarcopenia prediction value with a predetermined criterion to determine sarcopenia of the subject.

The electronic device for predicting the sarcopenia and the operation thereof according to an embodiment of the disclosure may be provided to determine a possibility of sarcopenia, severity, and the like by means of an eye image, a fundus image, a slit lamp examination image, and the like of the subject to save human and social costs and time and may provide the subject with efficient and active treatment and prevention strategies.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device for predicting sarcopenia, the electronic device comprising:
a memory; and
a processor connected with the memory and configured to execute instructions included in the memory,
wherein the processor extracts a first result value as output data for a first machine learning model by using a fundus image of a subject as input data for the first machine learning model and determines whether sarcopenia of the subject occurs based on the first result value, and
wherein the first result value includes a value for whether macular degeneration corresponding to the fundus image occurs and a value for whether retinopathy corresponding to the fundus image occurs,
wherein the processor extracts a second result value as output data for a second machine learning model by using an eye image of the subject as input data for the second machine learning model and determines whether the sarcopenia of the subject occurs based on the first result value and the second result value,
wherein the second result value includes a Marginal Reflex Distance 1 ("$MRD_1$") value of the subject corresponding to the eye image, an upper eyelid edge location change value, an eye closing speed value, and an eye opening speed value, the $MRD_1$ value being a distance where light is reflected from an upper eyelid edge to a cornea of the subject,
wherein the processor extracts a third result value as output data for a third machine learning model by using a slit lamp examination image of the subject as input data for the third machine learning model and determines whether the sarcopenia of the subject occurs based on the first result value, the second result value, and the third result value, and
wherein the third result value includes a value for whether pterygium corresponding to the slit lamp examination image occurs and a value for whether cataract corresponding to the slit lamp examination image occurs.

2. The electronic device of claim 1, wherein the processor differently sets weights respectively corresponding to the first result value, the second result value, and the third result value depending on basic information of the subject and determines the sarcopenia of the subject occurs based on the set weights, the first result value, the second result value, and the third result value.

3. The electronic device of claim 1, wherein the processor collects first training data, processes a first training dataset based on the first training data, constructs the first machine learning model based on the first training dataset, and determines performance of the first machine learning model at a predetermined period, and
wherein the first training data includes eye images for a plurality of subjects.

4. The electronic device of claim 1, wherein the processor collects second training data, processes a second training dataset based on the second training data, constructs the second machine learning model based on the second training dataset, and determines performance of the second machine learning model at a predetermined period, and
wherein the second training data includes fundus images for a plurality of subjects.

5. The electronic device of claim 1, wherein the processor collects third training data, processes a third training dataset based on the third training data, constructs the third machine learning model based on the third training dataset, and determines performance of the third machine learning model at a predetermined period, and wherein the third training data includes slit lamp examination images for a plurality of subjects.

6. An operation method of an electronic device for predicting sarcopenia, the operation method comprising:

collecting a fundus image of a subject;

extracting a first result value as output data for a first machine learning model by using the fundus image as input data for the first machine learning model;

determining whether there sarcopenia of the subject occurs based on the first result value;

collecting an eye image of the subject;

extracting a second result value as output data for a second machine learning model by using the eye image as input data for the second machine learning model; and determining whether the sarcopenia of the subject occurs based on the first result value and the second result value;

collecting a slit lamp examination image of the subject;

extracting a third result value as output data for a third machine learning model by using the slit lamp examination image as input data for the third machine learning model; and determining whether the sarcopenia of the subject occurs based on the first result value, the second result value, and the third result value, wherein the first result value includes a value for whether macular degeneration corresponding to the fundus image occurs and a value for whether retinopathy corresponding to the fundus image occurs, wherein the first result value includes a value for whether macular degeneration corresponding to the fundus image occurs and a value for whether retinopathy corresponding to the fundus image occurs, wherein the second result value includes a Marginal Reflex Distance 1 ("$MRD_1$") value of the subject corresponding to the eye image, an upper eyelid edge location change value, an eye closing speed value, and an eye opening speed value, the $MRD^1$ value being a distance where light is reflected from an upper eyelid edge to a cornea of the subject, and wherein the third result value includes a value for whether pterygium corresponding to the slit lamp examination image occurs and a value for whether cataract corresponding to the slit lamp examination image occurs.

7. An operation method of an electronic device for predicting sarcopenia, the operation method comprising:

collecting a first eye image of a subject;

extracting a feature point for an eye entity from the first eye image;

determining a first eye area based on the extracted feature point; and identifying first coordinates corresponding to an upper eyelid edge location for the determined first eye area and second coordinates corresponding to a pupil location for the determined first eye area;

calculating a Marginal Reflex Distance 1 ("$MRD_1$") value using the first coordinates and the second coordinates, the $MRD_1$ value being a distance where light is reflected from an upper eyelid edge to a cornea of the subject; and comparing the $MRD_1$ value with a predetermined threshold to predict the sarcopenia using a second machine learning model.

8. The operation method of claim 7, further comprising:

collecting a second eye image where the subject is looking down;

collecting a third eye image where the subject is looking up;

extracting a feature point for an eye entity from the second eye image and determining a second eye area corresponding to the second eye image based on the extracted feature point;

identifying third coordinates corresponding to an upper eyelid edge location for the determined second eye area;

extracting a feature point for an eye entity from the third eye image and determining a third eye area corresponding to the third eye image based on the extracted feature point;

identifying fourth coordinates corresponding to an upper eyelid edge location for the determined third eye area;

calculating an upper eyelid edge location change value using the third coordinates and the fourth coordinates; and predicting the sarcopenia based on the calculated upper eyelid edge location change value and the $MRD_1$ value using the second machine learning model.

9. The operation method of claim 8, further comprising:

collecting a fourth eye image at a first time point when the subject opens his or her eyes;

collecting a fifth eye image at a second time point when the subject closes the eyes;

collecting a sixth eye image at a third time point when the subject opens the eyes again;

extracting a feature point for an eye entity from the fourth eye image and determining a fourth eye area corresponding to the fourth eye image based on the extracted feature point;

identifying fifth coordinates corresponding to an upper eyelid edge location for the determined fourth eye area;

extracting a feature point for an eye entity from the fifth eye image and determining a fifth eye area corresponding to the fifth eye image based on the extracted feature point;

identifying sixth coordinates corresponding to an upper eyelid edge location for the determined fifth eye area;

extracting a feature point for an eye entity from the sixth eye image and determining a sixth eye area corresponding to the sixth eye image based on the extracted feature point;

identifying seventh coordinates corresponding to an upper eyelid edge location for the determined sixth eye area;

calculating a speed at which the subject closes the eyes and a speed at which the subject opens the eyes using the first time point, the second time point, the third time point, the fifth coordinates, the sixth coordinates, and the seventh coordinates; and predicting the sarcopenia based on the speed at which the subject closes the eyes, the speed at which the subject opens the eyes, the upper eyelid edge location change value, and the $MRD_1$ value using the second machine learning model.

* * * * *